US012315526B2

(12) United States Patent
Xu et al.

(10) Patent No.: US 12,315,526 B2
(45) Date of Patent: May 27, 2025

(54) METHOD AND APPARATUS FOR DETERMINING ECHO, AND STORAGE MEDIUM

(71) Applicant: BEIJING BAIDU NETCOM SCIENCE TECHNOLOGY CO., LTD., Beijing (CN)

(72) Inventors: Nan Xu, Beijing (CN); Saisai Zou, Beijing (CN); Li Chen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 250 days.

(21) Appl. No.: 18/061,151

(22) Filed: Dec. 2, 2022

(65) Prior Publication Data

US 2023/0096150 A1 Mar. 30, 2023

(30) Foreign Application Priority Data

Dec. 6, 2021 (CN) ......................... 202111480836.2

(51) Int. Cl.
*G10L 21/00* (2013.01)
*G10L 21/0208* (2013.01)

(52) U.S. Cl.
CPC *G10L 21/0208* (2013.01); *G10L 2021/02082* (2013.01)

(58) Field of Classification Search
CPC . G10L 21/0208; G10L 21/0216; G10L 25/30; G10L 25/84; G10L 2021/02082
USPC .......................................................... 704/226
See application file for complete search history.

(56) References Cited

U.S. PATENT DOCUMENTS

| | | | |
|---|---|---|---|
| 2018/0005642 A1 | 1/2018 | Wang | |
| 2018/0174598 A1 | 6/2018 | Shabestary et al. | |
| 2019/0172476 A1 | 6/2019 | Wung et al. | |
| 2020/0243104 A1 | 7/2020 | Kim et al. | |
| 2021/0020188 A1 | 1/2021 | Wung et al. | |

FOREIGN PATENT DOCUMENTS

| | | |
|---|---|---|
| CN | 1214818 | 4/1999 |
| CN | 101015133 | 8/2007 |
| CN | 111210799 | 5/2020 |

(Continued)

OTHER PUBLICATIONS

Ma et al., "Acoustic Echo Cancellation by Combining Adaptive Digital Filter and Recurrent Neural Network," arXiv:2005.09237v1, May 2020.

(Continued)

*Primary Examiner* — Md S Elahee
(74) *Attorney, Agent, or Firm* — Hodgson Russ LLP

(57) ABSTRACT

A method and an apparatus for determining an echo, and a storage medium. The implementation solution includes: obtaining an echo estimation result by performing echo estimation on an original audio signal; obtaining an optimization processing result by performing optimization processing on the echo estimation result, the optimization processing includes at least one of amplitude dimension optimization processing, phase dimension optimization processing, or time domain dimension optimization processing; and determining an echo of the original audio signal using the optimization processing result.

18 Claims, 5 Drawing Sheets

(56) References Cited

FOREIGN PATENT DOCUMENTS

| | | | |
|---|---|---|---|
| CN | 112687288 | 4/2021 | |
| CN | 113284507 A * | 8/2021 | ......... G10L 21/0216 |
| CN | 113689878 | 11/2021 | |
| CN | 113744748 | 12/2021 | |

OTHER PUBLICATIONS

Ma et al., "Multi-Scale Attention Neural Network for Acoustic Echo Cancellation," arXiv:2106.00010v1, May 2021.
Irvy et al., "Deep Residual Echo Suppression With a Tunable Tradeoff Between Signal Distortion and Echo Suppression," arXiv:2106.13531v1, Jun. 2021.
EPO, Extended European Search Report for EP Application No. 22211334,2. Apr. 12, 2023.
CNIPA, First Office Action for CN Application No. 202111480836.2, Jul. 13, 2022.
CNIPA, Notification to Grant Patent Right for Invention for CN Application No. 202111480836.2, Aug. 24, 2022.
Jiang et al., "Acoustic Echo Control Based on Frequency-domain Stage-wise Regression," Journal of Electronics & Information Technology, Dec. 2014, vol. 36, No. 12.

* cited by examiner

METHOD AND APPARATUS FOR DETERMINING ECHO, AND STORAGE MEDIUM

CROSS REFERENCE TO RELATED APPLICATION

This application claims priority to Chinese Patent Application No. 202111480836.2, filed on Dec. 6, 2021, the entire disclosure of which is incorporated herein by reference.

TECHNICAL FIELD

The present disclosure relates to a field of computer technologies, especially to fields of artificial intelligence (AI) and voice technologies, and specifically to a method and an apparatus for determining an echo, and a storage medium.

BACKGROUND

In a communication system, when a microphone is coupled to a speaker, the microphone may acquire a sound from the speaker, thereby generating an echo. The existence of the acoustic echo greatly affects tasks such as subsequent voice wake-up and recognition. In the related art, when a non-linear echo is determined, there is the problem of incomplete echo determination.

SUMMARY

The disclosure provides a method and an apparatus for determining an echo, and a storage medium.

According to an aspect of the embodiment, a method for determining an echo is provided, and includes: obtaining an echo estimation result by performing echo estimation on an original audio signal; obtaining an optimization processing result by performing optimization processing on the echo estimation result, the optimization processing includes at least one of amplitude dimension optimization processing, phase dimension optimization processing, or time domain dimension optimization processing; and determining an echo of the original audio signal using the optimization processing result.

According to another aspect of the embodiment, an apparatus for determining an echo is provided, and includes: at least one processor; and a memory communicatively connected to the at least one processor. The memory is stored with instructions executable by the at least one processor, the instructions are performed by the at least one processor, the at least one processor is caused to perform: obtaining an echo estimation result by performing echo estimation on an original audio signal; obtaining an optimization processing result by performing optimization processing on the echo estimation result, the optimization processing includes at least one of amplitude dimension optimization processing, phase dimension optimization processing, or time domain dimension optimization processing; and determining an echo of the original audio signal using the optimization processing result.

According to still another aspect of the disclosure, a non-transitory computer readable storage medium stored with computer instructions is provided, the computer instructions are configured to cause a computer to perform: obtaining an echo estimation result by performing echo estimation on an original audio signal; obtaining an optimization processing result by performing optimization processing on the echo estimation result, the optimization processing includes at least one of amplitude dimension optimization processing, phase dimension optimization processing, or time domain dimension optimization processing; and determining an echo of the original audio signal using the optimization processing result.

It should be understood that the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

Figure 1:
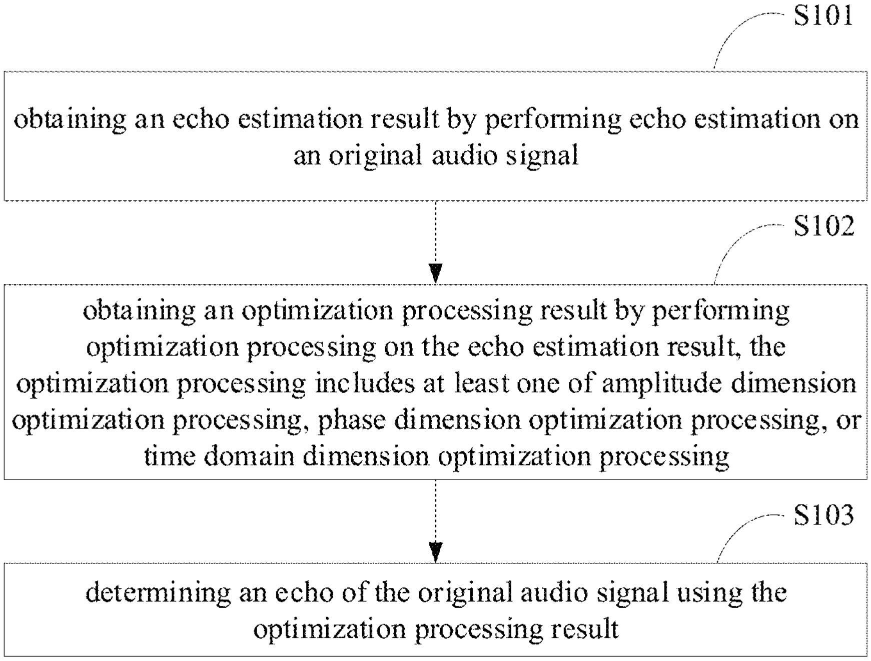
FIG. 1 is a flowchart illustrating a method for determining an echo according to the present disclosure.

As illustrated in FIG. 1, a method for determining an echo in the disclosure may include the following blocks.

At S101, an echo estimation result is obtained by performing echo estimation on an original audio signal.

At S102, an optimization processing result is obtained by performing optimization processing on the echo estimation result. The optimization processing includes at least one of amplitude dimension optimization processing, phase dimension optimization processing, or time domain dimension optimization processing.

At S103, an echo of the original audio signal is determined using the optimization processing result.

The method in the disclosure may be applied to an audio processing scene, for example, may be applied to an audio (video) conference scene, a voice wake-up scene, etc. The executive subject of the method may include a terminal such as a smart speaker (with a screen), a smartphone or a tablet.

The original audio signal may be an audio signal with an echo noise. Performing the echo estimation on the original audio signal may be implemented by a neural network model. For example, the neural network model may include an ideal ratio mask (IRM) model, a complex ideal ratio mask (cIRM) model, etc. The network structure of the neural network model may be a deep neural network (DNN), a convolutional neural network (CNN), a recurrent neural network (LSTM), etc., or, may be a hybrid network structure, for example, a combination of any two of the above network structures.

In an implementation, the neural network model may be a neural network model corresponding to an echo elimination technology. The model may perform echo recognition on the original audio signal to output a result as the echo estimation result. The form of the echo estimation result may be a mask, which may include $M_r$, $M_i$, corresponding to a real part and an imaginary part respectively.

The neural network model corresponding to the echo elimination technology may be pre-trained. An input of the neural network may include a short-time Fourier transform processing result of the original audio signal; or the input of the neural network may include a short-time Fourier transform processing result of the original audio signal and an amplitude feature of the original audio signal.

When the echo estimation result is obtained, the echo estimation result may be further corrected, to improve an accuracy of the echo estimation result. In an implementation, a correction may be performed on the echo estimation result from at least one of an amplitude dimension, a phase dimension and a time domain dimension, to obtain the optimization processing result. It is not difficult to understand that the more dimensions of the correction are, and the higher precision of the correction is.

The correction may be performed based on correction models corresponding to different dimensions. The correction models corresponding to different dimensions may be pre-trained. Thus, the optimization processing result for the echo correction result may be determined based on the correction models. The optimization processing result may be still the mask form.

In an additional implementation, an audio signal after separating an echo may be obtained by performing complex multiplying on the original audio signal and the mask.

Through the above process, when the echo estimation result is determined, multi-dimensional optimization processing is performed on the echo estimation result. Therefore, the problem that amplitude and phase information cannot be fully mined in an echo elimination algorithm is effectively optimized. Optimization in a time domain dimension may achieve a better echo elimination effect.

Figure 2:
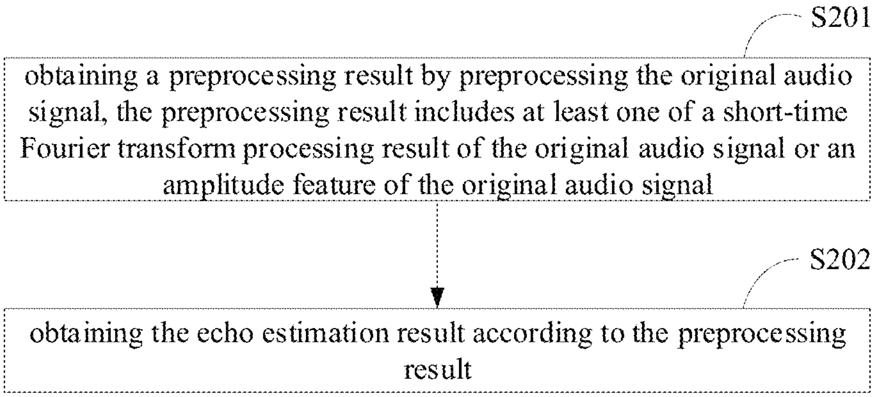
FIG. 2 is a flowchart illustrating a method of obtaining an echo estimation result according to the present disclosure.

As illustrated in FIG. 2, in an implementation, the block S101 may include the following blocks.

At S201, a preprocessing result is obtained by preprocessing the original audio signal, the preprocessing result includes at least one of a short-time Fourier transform processing result of the original audio signal or an amplitude feature of the original audio signal.

At S202, the echo estimation result is obtained according to the preprocessing result.

Preprocessing the original audio signal may include obtaining the short-time Fourier transform processing result by performing short-time Fourier transform processing on the original audio signal. In addition, preprocessing the original audio signal further may include extracting the amplitude feature of the original audio signal.

Obtaining the echo estimation result based on the preprocessing result may include inputting the preprocessing result into a pre-trained echo estimation model, to obtain the echo estimation result, namely, mask estimation, and the mask may include $M_r$, $M_i$ corresponding to a real part and an imaginary part respectively.

Correspondingly, training the neural network model corresponding to the echo elimination technology may be performed based on an input sample and a tagged result. That is, the neural network model corresponding to the echo elimination technology may obtain a predicted value of the echo estimation result based on the input sample, and train the neural network model corresponding to the echo elimination technology based on a difference between the predicted value and the tagging result, until the difference satisfies a predetermined requirement.

Through the above process, the pre-trained echo estimation model may effectively process a non-linear original audio signal.

Figure 3:
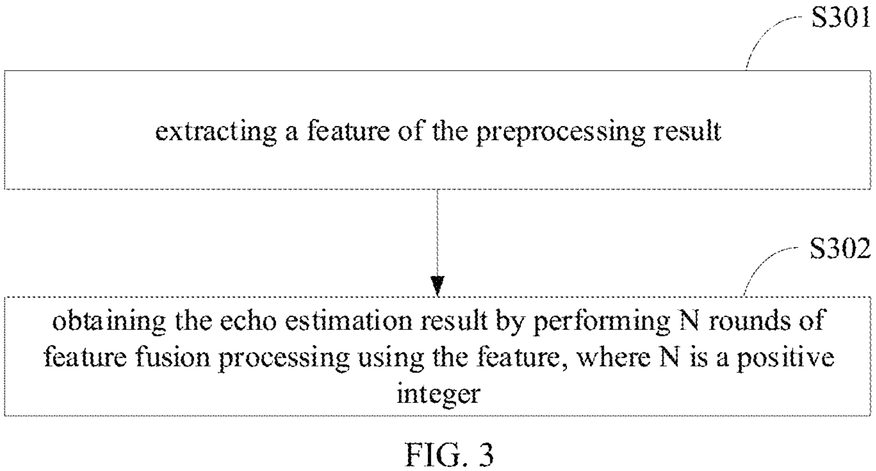
FIG. 3 is a flowchart illustrating another method of obtaining an echo estimation result according to the present disclosure.

As illustrated in FIG. 3, in an implementation, the block S202 may include the following blocks.

At S301, a feature of the preprocessing result is extracted.

At S302, the echo estimation result is obtained by performing N rounds of feature fusion processing using the feature, where N is a positive integer.

Figure 4:
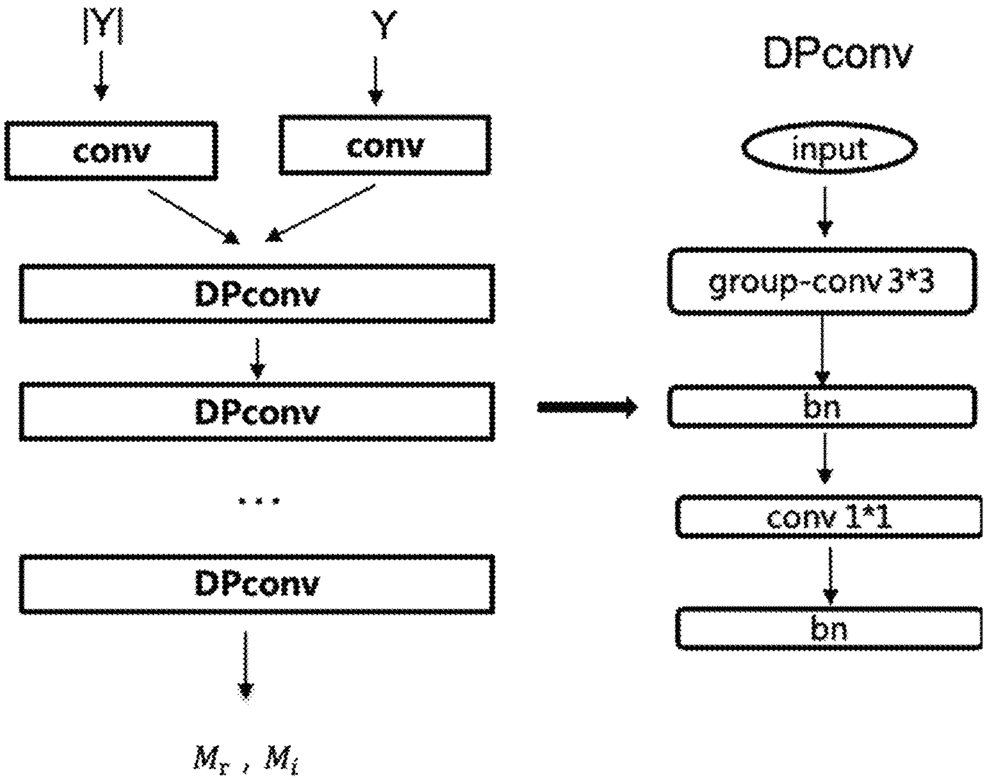
FIG. 4 is a diagram illustrating a network structure adopted by obtaining an echo estimation result according to the present disclosure.

FIG. 4 illustrates a network structure in an implementation. As illustrated in the previous implementation, in a case that the preprocessing result includes both the short-time Fourier transform processing result of the original audio signal and the amplitude feature of the original audio signal, the feature of each preprocessing result may be correspondingly extracted. The feature extraction way may include performing the feature extraction based on a conventional convolution operation. In FIG. 4, Y represents the short-time Fourier transform processing result of the original audio signal, |Y| represents the amplitude feature of the original audio signal, and cony represents the conventional convolution operation.

When the feature of the preprocessing result is extracted, the echo estimation result is finally output by performing the N rounds of feature fusion processing using the feature of the preprocessing result. In FIG. 4, "DPconv" represents a process of the feature fusion processing.

The number of rounds may be adjusted based on an actual situation, for example, a result of an N-th round may be taken as a final result in response to the number of rounds reaching N. Alternatively, the number of rounds may be determined based on a precision requirement on the output result, the higher the precision the more the number of rounds. The specific way of determining the number of rounds is not limited herein.

The echo estimation result, namely, the mask estimation, may be obtained through the feature fusion.

Figure 5:
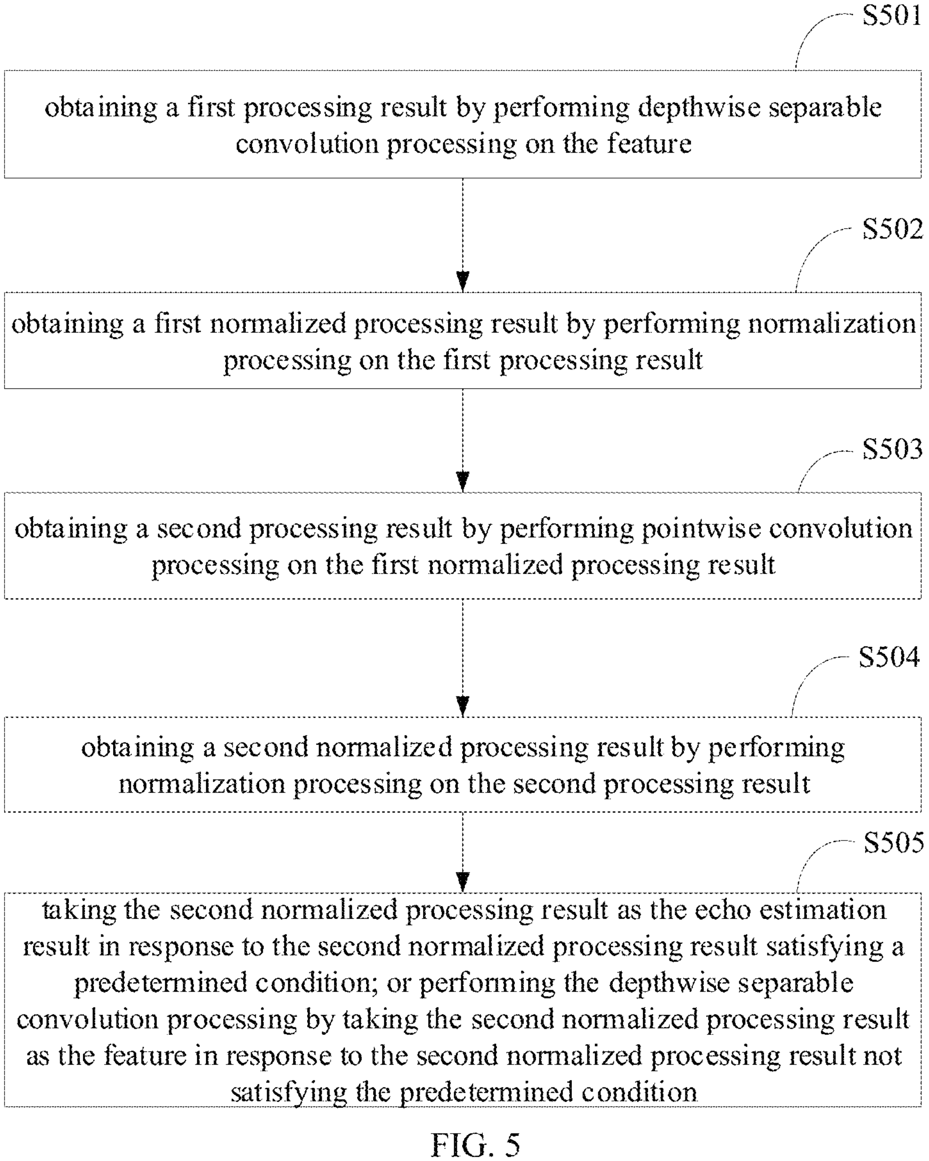
FIG. 5 is a flowchart illustrating a method of performing N rounds of feature fusion processing using a feature according to the present disclosure.

As illustrated in FIG. 5, in an implementation, the block S302 may include the following blocks.

At S501, a first processing result is obtained by performing depthwise separable convolution processing on the feature.

At S502, a first normalized processing result is obtained by performing normalization processing on the first processing result.

At S503, a second processing result is obtained by performing pointwise convolution processing on the first normalized processing result.

At S504, a second normalized processing result is obtained by performing normalization processing on the second processing result.

At S505, the second normalized processing result is taken as the echo estimation result in response to the second normalized processing result satisfying a predetermined condition; or the depthwise separable convolution processing is performed by taking the second normalized processing result as the feature in response to the second normalized processing result not satisfying the predetermined condition.

In response to a current round being a first round, an input of the current round is the feature of the preprocessing result. Otherwise, In response to the current round being an i-th round, where i is a positive integer, and $1<i\leq N$, the input of the current round is an output of an (i−1)-th round.

In combination with FIG. 4, taking any round for an example, the input of the round is simply described as the feature.

The first processing result may be obtained by performing the depthwise separable convolution processing on the feature. In FIG. 4, "group-conv3*3" represents depthwise separable convolution processing.

The first normalized processing result is obtained by performing the normalization processing on the first processing result. In FIG. 4, batch normalization ("bn") represents the normalization processing. The function of normalization is to perform normalization on an output of each node in depthwise separable convolution, thereby ensuring a feature resolution to the most extent.

The second processing result is obtained by performing the pointwise convolution processing on the first normalized processing result. In FIG. 4, "conv1*1" represents pointwise convolution.

Finally, the second normalized processing result is obtained by performing the normalization processing on the second processing result. The normalization process is the same as the above process, which will not be repeated here. When the second normalized processing result satisfies the predetermined condition, for example, the number of rounds reaches a corresponding threshold, or the second normalized processing result satisfies a precision requirement, etc., the second normalized processing result may be taken as an output of the round. Otherwise, when the second normalized processing result does not satisfy the predetermined condition, the second nominalized processing result output by a current round, e.g., i-th round, may be taken as an input value of a next round, e.g., (i+1)-th round.

With setting the above network structure, since the entire network does not configure an operation of downsampling, the amount of parameter of the network may be controlled within 200 KB, to facilitate the network to be deployed in a device such as a smart speaker, a smartphone and a tablet.

In an implementation, block S102 may include the following blocks.

A first adjustment value is obtained by inputting the echo estimation result into a pre-trained amplitude optimization model, The first adjustment value is configured to adjust the echo estimation result in an amplitude dimension.

The amplitude optimization model is obtained by training based on an amplitude of a voice signal sample with an echo and an amplitude of a voice signal sample removing the echo, and the voice signal sample removing the echo is a sample obtained by removing the echo from the voice signal sample with the echo.

The amplitude optimization model may be abstracted to a loss function model. The loss function model may be trained based on the following equation (1).

$$L_{irm}=mse(|M|,|S|/|Y|) \quad (1)$$

where $L_{irm}$ may be configured to represent a loss function, that is, corresponding to the amplitude dimension optimization processing; mse may be configured to represent an mean square error; |M| may be configured to represent an amplitude sample corresponding to an echo estimation result obtained by parsing the voice signal sample with the echo, $|M|=\sqrt{(M_r)^2+(M_i)^2}$; |S| may be configured to represent an amplitude of the voice signal sample removing the echo, and |Y| may be configured to represent an amplitude of the voice signal sample with the echo.

In a training process, a ratio of the amplitude of the voice signal sample removing the echo to the amplitude of the voice signal sample with the echo may calculated. $L_{irm}$ may be trained based on a mean square error between the amplitude sample and the calculated ratio. When a training result is converged, it represents that training is over.

Therefore, the first adjustment value may be obtained by inputting the echo estimation result into the pre-trained amplitude optimization model. The first adjustment value may be configured to adjust the echo estimation result.

Through the above process, the amplitude dimension adjustment may be made on the echo estimation result in the amplitude dimension.

In an implementation, block S102 may include the following blocks.

A second adjustment value is obtained by inputting the echo estimation result into a pre-trained first phase optimization model. The second adjustment value is configured to adjust the echo estimation result in a phase dimension.

The first phase optimization model is obtained by training based on complex ideal ratio masks. The complex ideal ratio masks are determined based on a voice signal sample with an echo and a voice signal sample removing the echo. The voice signal sample removing the echo is a sample obtained by removing the echo from the voice signal sample with the echo.

The first phase optimization model may be abstracted to a loss function model. The loss function model may be trained based on the following equation (2).

$$L_{cirm}=mse(M_r,T_r)+mse(M_i,T_i) \quad (2)$$

where, $L_{cirm}$ may be configured to represent a loss function, that is, corresponding to the phase dimension optimization processing; mse may be configured to represent a mean square error; $M_r$, $M_i$ may be configured to correspondingly represent a real part sample and an imaginary part sample of the complex ideal ratio mask corresponding to the echo estimation result obtained by parsing the voice signal sample with the echo; and $T_r$, $T_i$ may be configured to represent a real part truth value of an imaginary part truth value of the complex ideal ratio mask. The real part truth value and the imaginary part truth value may be pre-tagged.

In a training process, $L_{cirm}$ may be trained based on a mean square error between the real part sample and the real part truth value and a mean square error between the imaginary part sample and the imaginary part truth value. When a training result is converged, it represents that training is over.

Through the above process, the second adjustment value may be obtained by inputting the echo estimation result into the first phase optimization model. The second adjustment value may be configured to adjust the echo estimation result in the phase dimension.

In an implementation, block S102 further may include the following blocks.

A third adjustment value is obtained by inputting the echo estimation result into a pre-trained second phase optimization model. The third adjustment value is configured to adjust the echo estimation result in a phase dimension.

The second phase optimization model is obtained by training based on phase angles, the phase angles are determined based on a voice signal sample with an echo and a voice signal sample removing the echo, and the voice signal sample removing the echo is a sample obtained by removing the echo from the voice signal sample with the echo.

The second phase optimization model may be abstracted to a loss function model. The loss function model may be trained based on the following equation (3).

$$L_{sp} = r\left(\left|\frac{S}{Y}\right|\sin\frac{\theta(t, f) - \theta'(t', f')}{2}\right)^2 \tag{3}$$

in which, $L_{sp}$ may be configured to represent a loss function, that is, corresponding to the phase dimension optimization processing; r may be configured to represent a balance parameter (an empirical value);

$$\left|\frac{S}{Y}\right|$$

may be configured to represent a ratio of an amplitude (|S|) of the voice signal sample removing the echo to an amplitude (|Y|) of the voice signal sample with the echo; θ(t,f) may be configured to represent a phase angle determined based on an echo estimation result obtained by parsing the voice signal sample with the echo, t and f may correspondingly represent a value of the voice signal sample with the echo in a time domain and a value of the voice signal sample with the echo in a frequency domain; θ'(t',f') may be configured to represent a truth value of a phase angle, and t' and f' may be configured to represent a truth value of the value of the voice signal sample with the echo in the time domain and a truth value of the value of the voice signal sample with the echo in the frequency domain; the above truth values may be pre-calibrated.

Since a range of the phase angle is [−π, π], a maximum of a Sine value of the phase angle is 1. In a training process, the loss function model is trained based on a difference between the determined phase angle and the truth value of the phase angle. When a training result is converged, it represents that training is over.

In addition, in an implementation, the loss function models represented by the equation (2) and the equation (3) may be jointly trained based on the following equation (4).

$$L_{cirrm\text{-}sp} = L_{cirm} + L_{sp} \tag{4}$$

That is, the equation (4) may be abstracted to a loss function, and $L_{cirm\text{-}sp}$ corresponds to an entire phase dimension optimization processing. When a loss function of the equation (4) is converged, it represents joint training of the equation (2) and the equation (3) is over.

Based on the above solution, a part of phase features may be learned based on the complex ideal ratio masks corresponding to the equation (2), and then a remaining part of phase features may be learned based on the phase angles corresponding to the equation (3). The above method may fully mine the phase features of the original audio signal, thereby adjusting the echo estimation result in the phase dimension.

Figure 6:
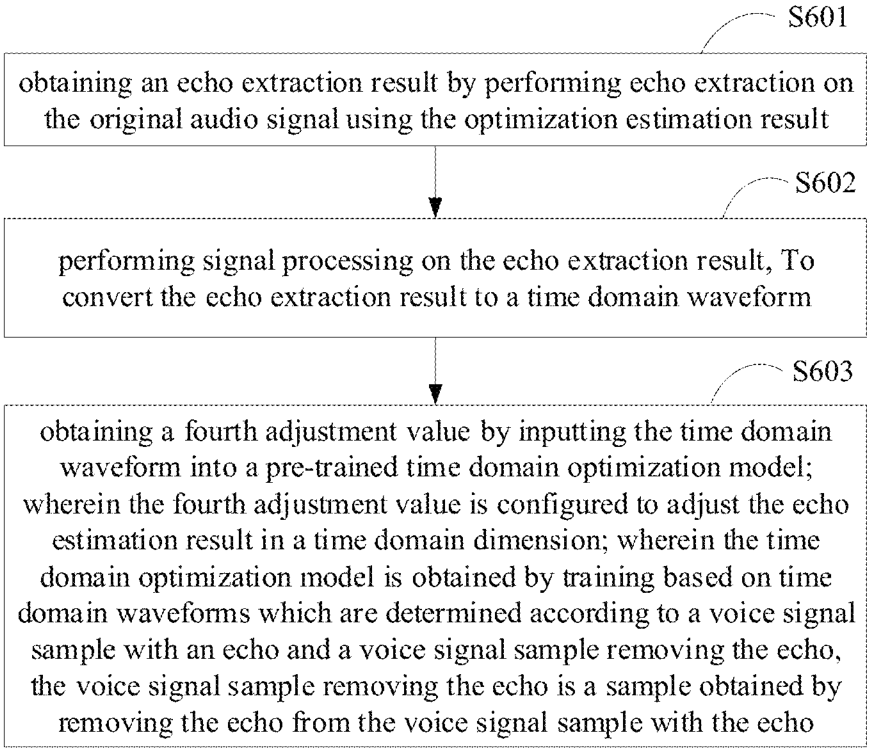
FIG. 6 is a flowchart illustrating a method of performing optimization processing on an echo estimation result according to the present disclosure.

As illustrated in FIG. 6, in an implementation, block S202 may include the following blocks.

At S601, an echo extraction result is obtained by performing echo extraction on the original audio signal using the optimization estimation result.

At S602, signal processing is performed on the echo extraction result, to convert the echo extraction result to a time domain waveform.

At S603, a fourth adjustment value is obtained by inputting the time domain waveform into a pre-trained time domain optimization model. The fourth adjustment value is configured to adjust the echo estimation result in a time domain dimension.

The time domain optimization model is obtained by training based on time domain waveforms which are determined according to a voice signal sample with an echo and a voice signal sample removing the echo, and the voice signal sample removing the echo is a sample obtained by removing the echo from the voice signal sample with the echo.

An audio signal after separating an echo may be obtained by complex multiplication of the echo estimation result and the original audio signal.

The audio signal may be transformed from a frequency domain to a time domain by performing inverse Fourier transform on the audio signal after separating the echo, that is, the time domain waveform is obtained.

The fourth adjustment value may be obtained by inputting the time domain waveform into the time domain optimization model.

The time domain optimization model may be abstracted to a loss function model, and the loss function model may be trained based on the time domain waveforms of the voice signal sample with the echo and the voice signal sample removing the echo. For example, the echo extraction result of the voice signal sample with the echo is obtained, and the echo extraction result is converted to the time domain waveform as a time domain waveform sample. The loss function model is trained based on difference comparison between the time domain waveform sample and the time domain waveform of the voice signal sample removing the echo. When a training result is converged, it represents that training is over.

Based on the above process, the time domain waveform of the echo extraction result is obtained using the echo estimation result, and the time domain waveform of the echo extraction result is input into the time domain optimization model to obtain the fourth adjustment value. The fourth adjustment value may be configured to adjust the echo estimation result in the time domain dimension.

Figure 7:
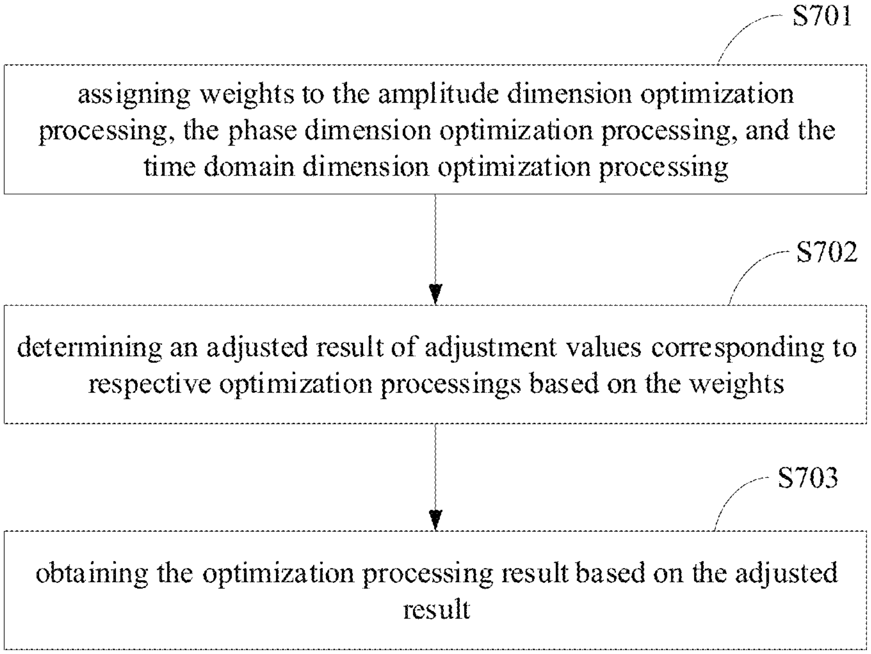
FIG. 7 is a flowchart illustrating another method of performing optimization processing on an echo estimation result according to the present disclosure.

As illustrated in FIG. 7, in an implementation, in a case that the optimization processing includes amplitude dimension optimization processing, phase dimension optimization processing, and time domain dimension optimization processing, the method further includes the following blocks.

At S701, weights are assigned to the amplitude dimension optimization processing, the phase dimension optimization processing, and the time domain dimension optimization processing.

At S702, an adjusted result of adjustment values corresponding to respective optimization processing is determined using the weights.

At S703, the optimization processing result is obtained based on the adjusted result.

The weights may be assigned based on an empirical value or based on actual situations. As an example, the weights corresponding to the amplitude dimension optimization processing, the phase dimension optimization processing, and the time domain dimension optimization processing may be represented as ε, α, ξ.

The adjustment value of each optimization processing may be performed based on the following equation (5), and in combination with the equation (1) to the equation (4), the equation (5) may be represented as:

$$L=\varepsilon L_{irm}+\alpha L_{cirm\text{-}sp}+\xi L_t+\beta L_{si\text{-}snr} \quad (5)$$

where, $L_t$ may be configured to represent the time domain dimension optimization processing, β may be configured to represent a weight, and $L_{si\text{-}snr}$ may be configured to represent a loss function based on scale-invariant signal-to-noise ratio. Overall optimization may be performed on the first adjustment value to the fourth adjustment value using $L_{si\text{-}snr}$ and the weight to obtain the corresponding adjusted result. The optimization processing result is obtained based on the adjusted result.

Based on the above process, overall optimization may be performed on results of a plurality of optimization processing simultaneously in a case that the optimization processing includes the plurality of optimization processing, thereby achieving the final optimization purpose.

Figure 8:
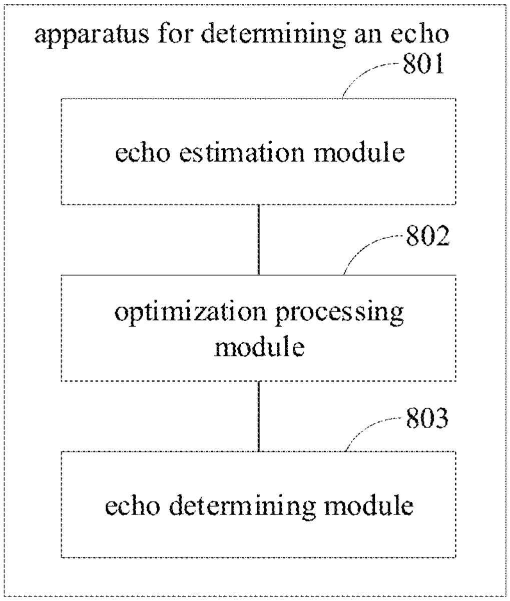
FIG. 8 is a diagram illustrating an apparatus for determining an echo according to the present disclosure.

As illustrated in FIG. 8, the apparatus for determining an echo in the disclosure may include an echo estimation module 801, an optimization processing module 802 and an echo determining module 803.

The echo estimation module 801 is configured to obtain an echo estimation result by performing echo estimation on an original audio signal; the optimization processing module 802 is configured to obtain an optimization processing result by performing optimization processing on the echo estimation result, the optimization processing includes at least one of amplitude dimension optimization processing, phase dimension optimization processing, or time domain dimension optimization processing; and the echo determining module 803 is configured to determine an echo of the original audio signal using the optimization processing result.

In an implementation, the echo estimation module 801 may specifically include a preprocessing submodule and an echo estimation result determining submodule.

The preprocessing submodule is configured to obtain a preprocessing result by preprocessing the original audio signal, the preprocessing result includes at least one of a short-time Fourier transform processing result of the original audio signal or an amplitude feature of the original audio signal; and the echo estimation result determining submodule is configured to obtain the echo estimation result according to the preprocessing result.

In an implementation, the echo estimation result determining submodule may specifically include a feature extraction unit and an echo estimation result determining unit.

The feature extraction unit is configured to extract a feature of the preprocessing result; and the echo estimation result determining unit is configured to obtain the echo estimation result by performing N rounds of feature fusion processing using the feature, where N is a positive integer.

In an implementation, the echo estimation result determining unit specifically may include a depthwise separable convolution processing subunit, a first normalization processing subunit, a pointwise convolution processing subunit, a second normalization processing subunit and a result determining subunit.

The depthwise separable convolution processing subunit is configured to obtain a first processing result by performing depthwise separable convolution processing on the feature; the first normalization processing subunit is configured to obtain a first normalized processing result by performing normalization processing on the first processing result; the pointwise convolution processing subunit is configured to obtain a second processing result by performing pointwise convolution processing on the first normalized processing result; the second normalization processing subunit is configured to obtain a second normalized processing result by performing normalization processing on the second processing result; and the result determining subunit is configured to take the second normalized processing result as the echo estimation result in response to the second normalized processing result satisfying a predetermined condition; or perform the depthwise separable convolution processing by taking the second normalized processing result as the feature in response to the second normalized processing result not satisfying a predetermined condition.

In an implementation, the optimization processing module 802 may specifically include an amplitude optimization submodule and an amplitude optimization model training submodule.

The amplitude optimization submodule is configured to obtain a first adjustment value by inputting the echo estimation result into a pre-trained amplitude optimization model; the first adjustment value is configured to adjust the echo estimation result in an amplitude dimension; and the amplitude optimization model training submodule is configured to obtain the amplitude optimization model by training based on an amplitude of a voice signal sample with an echo and an amplitude of a voice signal sample removing the echo, the voice signal sample removing the echo is a sample obtained by removing the echo from the voice signal sample with the echo.

In an implementation, the optimization processing module 802 may specifically include a first phase optimization submodule and a first phase optimization model training submodule.

The first phase optimization submodule is configured to obtain a second adjustment value by inputting the echo estimation result into a pre-trained first phase optimization model; and the first phase optimization model training submodule is configured to obtain the first phase optimization model by training based on complex ideal ratio masks, the complex ideal ratio masks are determined based on a voice signal sample with an echo and a voice signal sample removing the echo, and the voice signal sample removing the echo is a sample obtained by removing the echo from the voice signal sample with the echo.

In an implementation, the optimization processing module 802 further may include a second phase optimization submodule and a second phase optimization model training submodule.

The second phase optimization submodule is configured to obtain a third adjustment value by inputting the echo estimation result into a pre-trained second phase optimization model; and the second phase optimization model training submodule is configured to obtain the second phase optimization model by training based on phase angles, the phase angles are determined based on a voice signal sample with an echo and a voice signal sample removing the echo, and the voice signal sample removing the echo is a sample obtained by removing the echo from the voice signal sample with the echo.

In an implementation, the optimization processing module 802 may include an echo extraction submodule, a signal processing submodule, a time domain optimization submodule and a time domain optimization model training submodule.

The echo extraction submodule is configured to obtain an echo extraction result by performing echo extraction on the original audio signal using the optimization estimation result; the signal processing submodule is configured to perform signal processing on the echo extraction result, to convert the echo extraction result to a time domain waveform; the time domain optimization submodule is configured to obtain a fourth adjustment value by inputting the time domain waveform into a pre-trained time domain optimization model; and the time domain optimization model training submodule is configured to obtain the time domain optimization model by training based on time domain waveforms which are determined according to a voice signal sample with an echo and a voice signal sample removing the echo, the voice signal sample removing the echo is a sample obtained by removing the echo from the voice signal sample with the echo.

In an implementation, in a case that the optimization processing includes the amplitude dimension optimization processing, the phase dimension optimization processing, and the time domain dimension optimization processing, the optimization processing module 802 further may include a weight assignment submodule, an adjustment value optimization submodule and an optimization processing result determining submodule.

The weight assignment submodule is configured to assign a weight to the amplitude dimension optimization processing, the phase dimension optimization processing, and the time domain dimension optimization processing; the adjustment value optimization submodule is configured to determine an adjusted result of adjustment values corresponding to respective optimization processing based on the weight; and the optimization processing result determining submodule is configured to obtain the optimization processing result based on the adjusted result.

The acquisition, storage, and application of the user personal information involved in the technical solution of the disclosure comply with relevant laws and regulations, and do not violate public order and good customs.

According to the embodiment of the disclosure, an electronic device, a readable storage medium and a computer program product are further provided in the disclosure.

Figure 9:
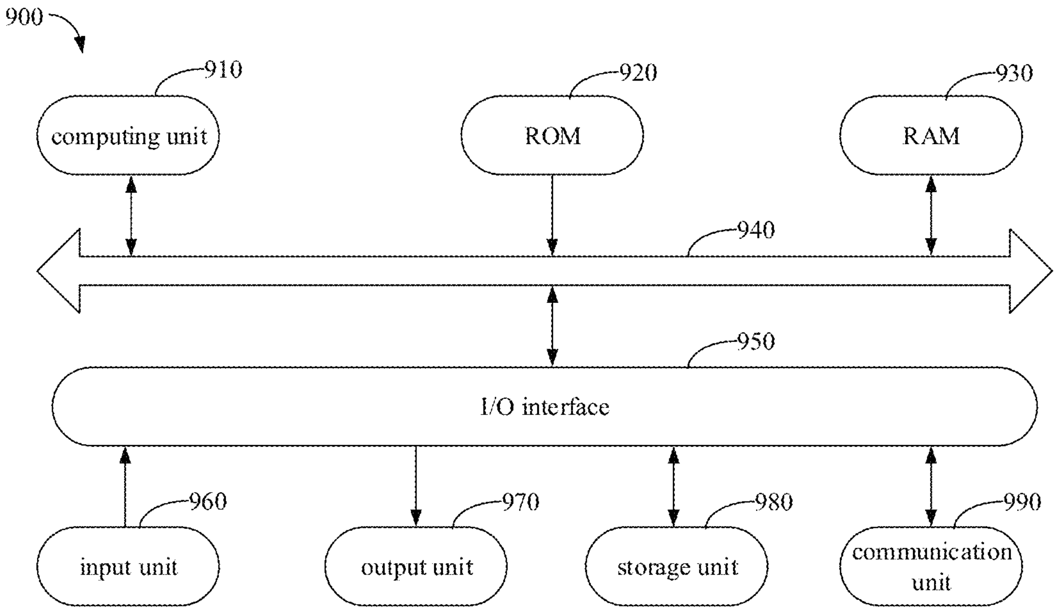
FIG. 9 is a block diagram illustrating an electronic device configured to implement a method for determining an echo in an embodiment of the present disclosure.

FIG. 9 illustrates a schematic block diagram of an example electronic device 900 configured to implement the embodiment of the disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 9, the device 900 includes a computing unit 910, which may execute various appropriate actions and processing based on a computer program stored in a read-only memory (ROM) 920 or a computer program loaded into a random access memory (RAM) 930 from a storage unit 980. In the RAM 930, various programs and data required for operation of the device 900 may also be stored. A computing unit 910, a ROM 902 and a RAM 930 may be connected with each other by a bus 940. An input/output (I/O) interface 950 is also connected to a bus 940.

Several components in the device 900 are connected to the I/O interface 950, and include: an input unit 960, for example, a keyboard, a mouse, etc.; an output unit 970, for example, various types of displays, speakers, etc.; a storage unit 980, for example, a magnetic disk, an optical disk, etc.; and a communication unit 990, for example, a network card, a modem, a wireless communication transceiver, etc. The communication unit 990 allows the device 900 to exchange information/data with other devices over a computer network such as the Internet and/or various telecommunication networks.

The computing unit 910 may be various general and/or dedicated processing components with processing and computing ability. Some examples of the computing unit 910 include but not limited to a central processing unit (CPU), a graphs processing unit (GPU), various dedicated artificial intelligence (AI) computing chips, various computing units running a machine learning model algorithm, a digital signal processor (DSP), and any appropriate processor, controller, microcontroller, etc. The computing unit 910 performs various methods and processing as described above, for example, a method for determining an echo. For example, in some embodiments, the method for determining an echo may be further achieved as a computer software program, which is physically contained in a machine readable medium, such as a storage unit 980. In some embodiments, some or all of the computer programs may be loaded and/or mounted on the device 900 via a ROM 920 and/or a communication unit 990. When the computer program is loaded on a RAM 930 and executed by a computing unit 910, one or more blocks in the method for determining an echo as described above may be performed. Alternatively, in other embodiments, a computing unit 910 may be configured to perform a method for determining an echo in other appropriate ways (for example, by virtue of a firmware).

Various implementation modes of the systems and technologies described above may be achieved in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, and further may be a server of a distributed system, or a server in combination with a blockchain.

It should be understood that, various forms of procedures shown above may be configured to reorder, add or delete blocks. For example, blocks described in the disclosure may be executed in parallel, sequentially, or in different orders, as long as the desired result of the technical solution disclosed in the present disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of the present disclosure.

What is claimed is:

1. A method for determining an echo, comprising:

obtaining an echo estimation result by performing echo estimation on an original audio signal;

obtaining an optimization processing result by performing optimization processing on the echo estimation result, wherein, the optimization processing comprises at least one of amplitude dimension optimization processing, phase dimension optimization processing, or time domain dimension optimization processing; and determining an echo of the original audio signal using the optimization processing result;

wherein performing the optimization processing on the echo estimation result comprises:

obtaining an echo extraction result by performing echo extraction on the original audio signal using the echo estimation result;

performing signal processing on the echo extraction result to convert the echo extraction result to a time domain waveform; and obtaining a fourth adjustment value by inputting the time domain waveform into a pre-trained time domain optimization model; wherein the fourth adjustment value is configured to adjust the echo estimation result in a time domain dimension;

wherein the time domain optimization model is obtained by training based on time domain waveforms which are determined according to a voice signal sample with an echo and a voice signal sample removing the echo, the voice signal sample removing the echo is a sample obtained by removing the echo from the voice signal sample with the echo.

2. The method of claim 1, wherein obtaining the echo estimation result by performing the echo estimation on the original audio signal comprises:

obtaining a preprocessing result by preprocessing the original audio signal, wherein, the preprocessing result comprises at least one of a short-time Fourier transform processing result of the original audio signal or an amplitude feature of the original audio signal; and obtaining the echo estimation result according to the preprocessing result.

3. The method of claim 2, wherein obtaining the echo estimation result based on the preprocessing result comprises:

extracting a feature of the preprocessing result; and obtaining the echo estimation result by performing N rounds of feature fusion processing using the feature, where N is a positive integer.

4. The method of claim 3, wherein obtaining the echo estimation result by performing the N rounds of feature fusion processing using the feature comprises:

obtaining a first processing result by performing depthwise separable convolution processing on the feature;

obtaining a first normalized processing result by performing normalization processing on the first processing result;

obtaining a second processing result by performing pointwise convolution processing on the first normalized processing result;

obtaining a second normalized processing result by performing normalization processing on the second processing result; and taking the second normalized processing result as the echo estimation result in response to the second normalized processing result satisfying a predetermined condition; or performing the depthwise separable convolution processing by taking the second normalized processing result as the feature in response to the second normalized processing result not satisfying the predetermined condition.

5. The method of claim 1, wherein performing the optimization processing on the echo estimation result comprises:

obtaining a first adjustment value by inputting the echo estimation result into a pre-trained amplitude optimization model; wherein the first adjustment value is configured to adjust the echo estimation result in an amplitude dimension;

wherein, the amplitude optimization model is obtained by training based on an amplitude of a voice signal sample with an echo and an amplitude of a voice signal sample removing the echo, the voice signal sample removing the echo is a sample obtained by removing the echo from the voice signal sample with the echo.

6. The method of claim 1, wherein performing the optimization processing on the echo estimation result comprises:

obtaining a second adjustment value by inputting the echo estimation result into a pre-trained first phase optimization model; wherein the second adjustment value is configured to adjust the echo estimation result in a phase dimension;

wherein, the first phase optimization model is obtained by training based on complex ideal ratio masks, the complex ideal ratio masks are determined based on a voice signal sample with an echo and a voice signal sample removing the echo, and the voice signal sample removing the echo is a sample obtained by removing the echo from the voice signal sample with the echo.

7. The method of claim 1, wherein performing the optimization processing on the echo estimation result further comprising:

obtaining a third adjustment value by inputting the echo estimation result into a pre-trained second phase optimization model; wherein the third adjustment value is configured to adjust the echo estimation result in a phase dimension;

wherein the second phase optimization model is obtained by training based on phase angles, the phase angles are determined based on a voice signal sample with an echo and a voice signal sample removing the echo, and the voice signal sample removing the echo is a sample obtained by removing the echo from the voice signal sample with the echo.

8. The method of claim 1, wherein in a case that the optimization processing comprises the amplitude dimension optimization processing, the phase dimension optimization processing and the time domain dimension optimization processing, performing the optimization processing on the echo estimation result further comprises:

assigning weights to the amplitude dimension optimization processing, the phase dimension optimization processing, and the time domain dimension optimization processing;

determining an adjusted result of adjustment values corresponding to respective optimization processing based on the weights; and obtaining the optimization processing result based on the adjusted result.

9. An apparatus for determining an echo, comprising:

at least one processor; and a memory communicatively connected to the at least one processor;

wherein the memory is stored with instructions executable by the at least one processor, the instructions are performed by the at least one processor, the at least one processor is caused to perform:

obtaining an echo estimation result by performing echo estimation on an original audio signal;

obtaining an optimization processing result by performing optimization processing on the echo estimation result, wherein, the optimization processing comprises at least one of amplitude dimension optimization processing, phase dimension optimization processing, or time domain dimension optimization processing; and determining an echo of the original audio signal using the optimization processing result;

wherein the at least one processor is caused to perform:

obtaining an echo extraction result by performing echo extraction on the original audio signal using the echo estimation result;

performing signal processing on the echo extraction result, to convert the echo extraction result to a time domain waveform; and obtaining a fourth adjustment value by inputting the time domain waveform into a pre-trained time domain optimization model;

wherein the time domain optimization model is obtained by training based on time domain waveforms which are determined according to a voice signal sample with an echo and a voice signal sample removing the echo, the voice signal sample removing the echo is a sample obtained by removing the echo from the voice signal sample with the echo.

10. The apparatus of claim 9, wherein the at least one processor is caused to perform:

obtaining a preprocessing result by preprocessing the original audio signal, wherein, the preprocessing result comprises at least one of a short-time Fourier transform processing result of the original audio signal or an amplitude feature of the original audio signal; and obtaining the echo estimation result according to the preprocessing result.

11. The apparatus of claim 10, wherein the at least one processor is caused to perform:

extracting a feature of the preprocessing result; and obtaining the echo estimation result by performing N rounds of feature fusion processing using the feature, where N is a positive integer.

12. The apparatus of claim 11, wherein the at least one processor is caused to perform:

obtaining a first processing result by performing depthwise separable convolution processing on the feature;

obtaining a first normalized processing result by performing normalization processing on the first processing result;

obtaining a second processing result by performing pointwise convolution processing on the first normalized processing result;

obtaining a second normalized processing result by performing normalization processing on the second processing result; and taking the second normalized processing result as the echo estimation result in response to the second normalized processing result satisfying a predetermined condition; or performing the depthwise separable convolution processing by taking the second normalized processing result as the feature in response to the second normalized processing result not satisfying the predetermined condition.

13. The apparatus of claim 9, wherein the at least one processor is caused to perform:

obtaining a first adjustment value by inputting the echo estimation result into a pre-trained amplitude optimization model; wherein the first adjustment value is configured to adjust the echo estimation result in an amplitude dimension;

wherein the amplitude optimization model is obtained by training based on an amplitude of a voice signal sample with an echo and an amplitude of a voice signal sample removing the echo, the voice signal sample removing the echo is a sample obtained by removing the echo from the voice signal sample with the echo.

14. The apparatus of claim 9, wherein the at least one processor is caused to perform:

obtaining a second adjustment value by inputting the echo estimation result into a pre-trained first phase optimization model;

wherein the first phase optimization model is obtained by training based on complex ideal ratio masks, the complex ideal ratio masks are determined based on a voice signal sample with an echo and a voice signal sample removing the echo, and the voice signal sample removing the echo is a sample obtained by removing the echo from the voice signal sample with the echo.

15. The apparatus of claim 9, wherein the at least one processor is caused to perform:

obtaining a third adjustment value by inputting the echo estimation result into a pre-trained second phase optimization model;

wherein the second phase optimization model is obtained by training based on phase angles, the phase angles are determined based on a voice signal sample with an echo and a voice signal sample removing the echo, and the voice signal sample removing the echo is a sample obtained by removing the echo from the voice signal sample with the echo.

16. The apparatus of claim 9, wherein, the at least one processor is caused to perform:

in a case that the optimization processing comprises the amplitude dimension optimization processing, the phase dimension optimization processing, and the time domain dimension optimization processing, assigning weights to the amplitude dimension optimization processing, the phase dimension optimization processing, and the time domain dimension optimization processing;

determining an adjusted result of adjustment values corresponding to respective optimization processing based on the weights; and obtaining the optimization processing result based on the adjusted result.

17. A non-transitory computer readable storage medium stored with computer instructions, the computer instructions are configured to cause a computer to perform:

obtaining an echo estimation result by performing echo estimation on an original audio signal;

obtaining an optimization processing result by performing optimization processing on the echo estimation result, wherein, the optimization processing comprises at least one of amplitude dimension optimization processing, phase dimension optimization processing, or time domain dimension optimization processing; and determining an echo of the original audio signal using the optimization processing result;

wherein performing the optimization processing on the echo estimation result comprises:

obtaining an echo extraction result by performing echo extraction on the original audio signal using the echo estimation result;

performing signal processing on the echo extraction result to convert the echo extraction result to a time domain waveform; and obtaining a fourth adjustment value by inputting the time domain waveform into a pre-trained time domain optimization model; wherein the fourth adjustment value is configured to adjust the echo estimation result in a time domain dimension;

wherein the time domain optimization model is obtained by training based on time domain waveforms which are determined according to a voice signal sample with an echo and a voice signal sample removing the echo, the voice signal sample removing the echo is a sample obtained by removing the echo from the voice signal sample with the echo.

18. The storage medium of claim 17, wherein obtaining the echo estimation result by performing the echo estimation on the original audio signal comprises:

obtaining a preprocessing result by preprocessing the original audio signal, wherein, the preprocessing result comprises at least one of a short-time Fourier transform processing result of the original audio signal or an amplitude feature of the original audio signal; and obtaining the echo estimation result according to the preprocessing result.

* * * * *